(12) United States Patent
Albrektsson et al.

(10) Patent No.: US 12,525,796 B2
(45) Date of Patent: Jan. 13, 2026

(54) ENERGY SUPPLY MODES FOR ELECTRICALLY POWERED MINING OR CONSTRUCTION MACHINES

(71) Applicant: EPIROC ROCK DRILLS AKTIEBOLAG, Örebro (SE)

(72) Inventors: Jörgen Albrektsson, Örebro (SE); Patrik Roth, Vintrosa (SE); Emil Andersson, Fjugesta (SE); Johannes Skoglund, Kolsva (SE); Anders Nilsson, Örebro (SE)

(73) Assignee: EPIROC ROCK DRILLS AKTIEBOLAG, Örebro (SE)

( * ) Notice: Subject to any disclaimer, the term of this patent is extended or adjusted under 35 U.S.C. 154(b) by 0 days.

(21) Appl. No.: 18/712,287

(22) PCT Filed: Dec. 8, 2021

(86) PCT No.: PCT/SE2021/051222
§ 371 (c)(1),
(2) Date: May 22, 2024

(87) PCT Pub. No.: WO2023/091057
PCT Pub. Date: May 25, 2023

(65) Prior Publication Data
US 2025/0023346 A1    Jan. 16, 2025

(30) Foreign Application Priority Data
Nov. 22, 2021    (SE) .................................... 2151419-5

(51) Int. Cl.
*H02J 1/00*         (2006.01)
*E21B 7/02*         (2006.01)
(Continued)

(52) U.S. Cl.
CPC .................. *H02J 1/14* (2013.01); *E21B 7/02* (2013.01); *H02J 3/381* (2013.01); *H02J 7/0068* (2013.01);
(Continued)

(58) Field of Classification Search
CPC ...... H02J 3/28; H02J 3/381; H02J 3/06; H02J 3/30; H02J 2300/30; H02J 2310/48;
(Continued)

(56) References Cited

U.S. PATENT DOCUMENTS

2013/0271083 A1    10/2013    Williams
2017/0302218 A1    10/2017    Janik
(Continued)

FOREIGN PATENT DOCUMENTS

EP     2711233 A2      3/2014
WO     2011080392 A1   7/2011
(Continued)

OTHER PUBLICATIONS

International Search Report and Written Opinion mailed Aug. 12, 2022 for International Application No. PCT/SE2021/051222, 10 pages.

*Primary Examiner* — Tuan T Lam
(74) *Attorney, Agent, or Firm* — Sage Patent Group

(57) ABSTRACT

A method of power distribution in an electronic control system at an electrically powered mining or construction machine. A line converter is selectively connectable to a mains power source and an on-board battery and/or fuel cell. Predefined energy supply modes are provided, defining how energy is to be distributed by predefined control sequences defining start-up sequences for initiating, shutdown sequences for terminating, and handover sequences for changing from a first to a second energy supply mode. In response to operator selection of activation of a specific (Continued)

energy supply mode is executed the predefined control sequence for start-up of, or if already operating in another mode handover to, the operator selected specific energy supply mode, or in response to operator selection of de-activation of a specific energy supply mode, the predefined shutdown sequences for terminating the operator selected specific energy supply mode.

11 Claims, 3 Drawing Sheets

(51) Int. Cl.
*H02J 1/14* (2006.01)
*H02J 3/38* (2006.01)
*H02J 7/00* (2006.01)
*B60L 1/00* (2006.01)
*B60L 50/50* (2019.01)

(52) U.S. Cl.
CPC ............... *B60L 1/00* (2013.01); *B60L 50/50* (2019.02); *B60L 2200/40* (2013.01); *H02J 2300/30* (2020.01); *H02J 2310/48* (2020.01)

(58) Field of Classification Search
CPC .... H02J 7/04; H02J 7/34; H02J 7/0025; H02J 1/14; E21B 7/02; B60L 1/00; B60L 50/50; B60L 2200/40; B60L 50/53; B60L 50/75; B60L 1/003
See application file for complete search history.

(56) References Cited

U.S. PATENT DOCUMENTS

| | | |
|---|---|---|
| 2018/0123384 A1* | 5/2018 | Foo ...................... H02J 7/0068 |
| 2019/0241091 A1 | 8/2019 | Lee et al. |
| 2020/0139088 A1* | 5/2020 | Baid ................. A61M 25/0606 |
| 2025/0023377 A1* | 1/2025 | Albrektsson ........ H02J 7/00714 |

FOREIGN PATENT DOCUMENTS

| | | |
|---|---|---|
| WO | 2013162448 A1 | 10/2013 |
| WO | 2019088899 A1 | 5/2019 |

* cited by examiner

ENERGY SUPPLY MODES FOR ELECTRICALLY POWERED MINING OR CONSTRUCTION MACHINES

CROSS-REFERENCE TO RELATED APPLICATIONS

This application is a 35 U.S.C. § 371 national stage application for International Application No. PCT/SE2021/051222, entitled "ENERGY SUPPLY MODES FOR ELECTRICALLY POWERED MINING OR CONSTRUCTION MACHINES", filed on Dec. 8, 2021, which claims priority to Swedish Patent Application No. 2151419-5, filed on Nov. 22, 2021, the disclosures and contents of which are hereby incorporated by reference in their entireties.

FIELD OF THE INVENTION

The present invention relates to the field of electrical power distribution in an electronic control system at an electrically powered mining or construction machine, and more specifically to a method of electrical power distribution in an electronic control system at an electrically powered mining or construction machine and such an electronic control system.

BACKGROUND OF THE INVENTION

Surface drill rigs, which are typically used in open pits, road construction and construction sites to drill holes in rock so that e.g. blasting can then be carried out, today is driven almost exclusively by internal combustion engines, typically diesel engines. The internal combustion engine converts liquid or gaseous chemical energy into kinetic energy that drives the drill rig. Internal combustion engines have a disadvantage in that the exhaust gases they emit contain gases that are harmful to the environment, e.g. NOx, HC, CO, PM but also CO2 which has a climate impact. By replacing the energy source with electricity and the motors with electric motors, it is possible to have almost zero exhaust emissions from such drill rigs. Energy efficiency also increases when internal combustion engines are replaced by electric motors as these have higher efficiency.

In order to be able to operate a drill rig with electricity, electrical energy must be supplied to the rig or alternatively stored or created on-board. Traditionally, comparable machines, e.g. electric Pit-Vipers or electric underground drill rigs, are supplied with electricity from the electrical grid via a cable.

One difficulty, when supplying a drill rig with electrical energy via a cable, is that the cable makes it difficult to move the drilling rig as the rig must always be connected to the electrical grid and the cable, for practical reasons, has a limited length limiting furthest travel. Furthermore, the cables used are often thick and rigid making them awkward to avoid when performing complex maneuvering with the drilling rig or when repeatedly reversing shorter distances whilst adjusting the position thereof. It is generally difficult to move the drilling rig and avoid running over the cable, which can be severely damaged or severed by running over it.

To reduce the difficulty of cable management and to increase the autonomy of the electric surface drill rig, the drill rig can be equipped with an electrical energy storage, e.g. an electric battery, supercapacitor, or a chemical energy store that can be converted into electrical energy, e.g. hydrogen combined with a fuel cell. In this way, the drill rig can be used without a cable connected.

One problem with having only one energy storage on-board the drill rig is that the energy storage is finite, i.e. a battery must be charged and a hydrogen tank filled. When the energy storage is replenished, the actual work of the drill rig, i.e. drilling holes, must be paused and working hours are lost. Depending on the size of the energy storage supplied on the rig, this may happen often.

SUMMARY OF THE INVENTION

An objective of the present disclosure is to provide a simple and secure solution for electrical power distribution by an electronic control system at an electrically powered mining or construction machine.

This is provided by a method of electrical power distribution in an electronic control system at an electrically powered mining or construction machine that includes a man machine interface (MMI) and a line converter that is selectively connectable to a mains power source and a battery and/or fuel cell mounted on-board the machine where both the mains power source and the battery and/or fuel cell are connected to a DC bus arranged to supply on-board consumers of electrical energy, the method comprising: providing a number of predefined energy supply modes (ESM) in the electronic control system defining how energy from any connected mains power source and the battery and/or fuel cell is to be distributed to the on-board consumers, each respective energy supply mode individually operator selectable using the man machine interface, providing a number of predefined control sequences in the electronic control system defining start-up sequences for initiating each respective energy supply mode, shutdown sequences for terminating each respective energy supply mode, and handover sequences for changing from a first selected energy supply mode to a second subsequently selected energy supply mode; controlling, by the control system, in response to operator selection information from the man machine interface of selection of activation of a specific energy supply mode, the predefined control sequence for start-up of, or if already operating in another energy supply mode handover to, the operator selected specific energy supply mode, or in response to operator selection information from the man machine interface of selection of de-activation of a specific energy supply mode, the predefined shutdown sequences for terminating the operator selected specific energy supply mode.

The herein proposed system ensures an energy and cost-effective selection of which source of energy electrical power consumed by the vehicle originates from. It furthermore provides user-friendly operator overview of which source the electrical energy comes from and allows for making active choices without having to control the underlying electrical sequences. The safety of electrical connection and disconnection is improved when there is well-defined sequences and transitions, mode changes. Downtime is reduced when the start-up and change of energy supply mode is systematized.

In one embodiment, the method further comprises making selectable via the man machine interface: an ESM Automatic mode, when at least one of the mains power source and the battery are connected; an ESM Battery mode, when only the battery is connected; an ESM Automatic Fuel cell mode, when at least one of the mains power source, the fuel cell or the fuel cell and battery are connected; an ESM Fuel cell mode, when either only the fuel cell or the fuel cell and battery is connected; an ESM Electric Grid mode, when only the mains power source is connected; and an ESM Auxiliary power mode, when at least one of the mains power source and the battery and/or fuel cell are connected and all but a pre-determined selection of on-board consumers are inactive.

In one embodiment, the method further comprises controlling, in the ESM Automatic mode, supply of electrical energy to all on-board consumers to be from the mains power source whilst either controlling the line converter to balance the power output from the mains power source against the requirement of the on-board consumers maintaining a current SOC level of the battery, or alternatively controlling the line converter to increase the power output from the mains power source above the requirement of the on-board consumers increasing the SOC level of the battery, or controlling the line converter to decrease the power output from the mains power source below the requirement of the on-board consumers decreasing the SOC level of the battery.

In one embodiment, the method further comprises controlling, in the ESM Battery mode, supply of electrical energy to all on-board consumers to be from the battery only.

In one embodiment, the method further comprises controlling, in the ESM Automatic Fuel cell mode, supply of electrical energy to all on-board consumers to be from the mains power source or controlling the line converter to balance the power output from the mains power source and the power output from the fuel cell or the fuel cell and battery against the requirement of the on-board consumers.

In one embodiment, the method further comprises controlling, in the ESM Fuel cell mode, supply of electrical energy to all on-board consumers to either be only from the fuel cell or from the fuel cell and battery.

In one embodiment, the method further comprises controlling, in the ESM Electric Grid mode, supply of electrical energy to all on-board consumers to be from the mains power source only.

In one embodiment, the method further comprises controlling, in the ESM Auxiliary power mode, supply of electrical energy to the pre-determined selection of on-board consumers to be from either only the mains power source, only the battery and/or fuel cell or both the mains power source and the battery and/or fuel cell.

In one embodiment, the method further comprises checking during the predefined control sequence for start-up of the ESM Automatic mode if the mains power source is connected and if determined not connected initiating a pre-defined control sequence for changing from the ESM Automatic to the ESM Battery mode and providing to the man machine interface (MMI) information that the machine is operating in the ESM Battery mode.

In a second aspect of the present disclosure, there is provided an electronic control system at an electrically powered mining or construction machine that includes a man machine interface (MMI) and a line converter that is selectively connectable to a mains power source and a battery and/or fuel cell mounted on-board the machine where both the mains power source and the battery and/or fuel cell are connected to a DC bus arranged to supply on-board consumers of electrical energy, the control system being arranged to perform the above method.

In a third aspect of the present disclosure, there is provided a non-transitory computer-readable storage medium that stores a program configured to execute the method of electrical power distribution in an electronic control system according to the second aspect.

In a fourth aspect of the present disclosure, there is provided a computer program product comprising instructions which, when the program is executed by a computer, cause the computer to carry out the method of electrical power distribution in an electronic control system according to the second aspect.

BRIEF DESCRIPTION OF THE DRAWINGS

With reference to the appended drawings, below follows a more detailed description of example embodiments of the invention, wherein.

DETAILED DESCRIPTION OF EXAMPLE EMBODIMENTS

Figure 1:
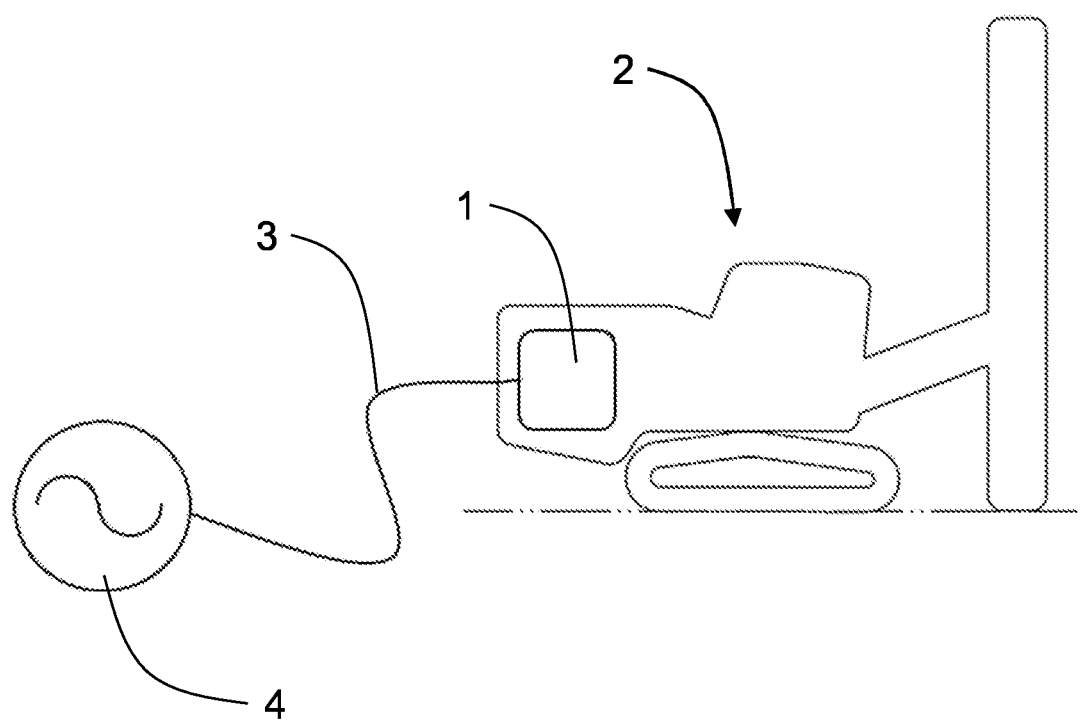
FIG. 1 shows a schematic view of a surface drill rig that is electrified and has an electric battery on-board and the possibility of connecting a cable to the electrical grid.

In the following, a detailed description of a method of electrical power distribution in an electronic control system 9 at an electrically powered mining or construction machine 2 and an electronic control system 9 arranged to perform the method according to the present disclosure is presented.

The electrically powered mining or construction machine 2 includes a man machine interface (MMI) 10 and a line converter 5 that is selectively connectable to a mains power source 4 and a battery 6 and/or fuel cell mounted on-board the machine 2 where both the mains power source 4 and the battery 6 and/or fuel cell are connected to a DC bus 7 arranged to supply on-board consumers 8 of electrical energy. Batteries 6, as described herein, also include supercapacitors or other types of chargeable/dischargeable electric energy storages.

In the drawing figures, like reference numerals designate identical or corresponding elements throughout the several figures. It will be appreciated that these figures are for illustration only and do not in any way restrict the scope of the present disclosure.

The expression "mining or construction machines" as used in the present disclosure may include production, exploration, and construction mining rigs for surface applications.

Drilling rigs are used for several purposes, exploration drilling which aims to identify the location and quality of a mineral, and production drilling, used in the production-cycle for mining and/or construction.

With reference to FIG. 1, is illustrated schematically a surface drill rig 2 used to exemplify the invention, which surface drill rig 2 is electrified and has an electric battery 1 on-board and the possibility of connecting a cable 3 to an electrical grid 4.

Figure 2:
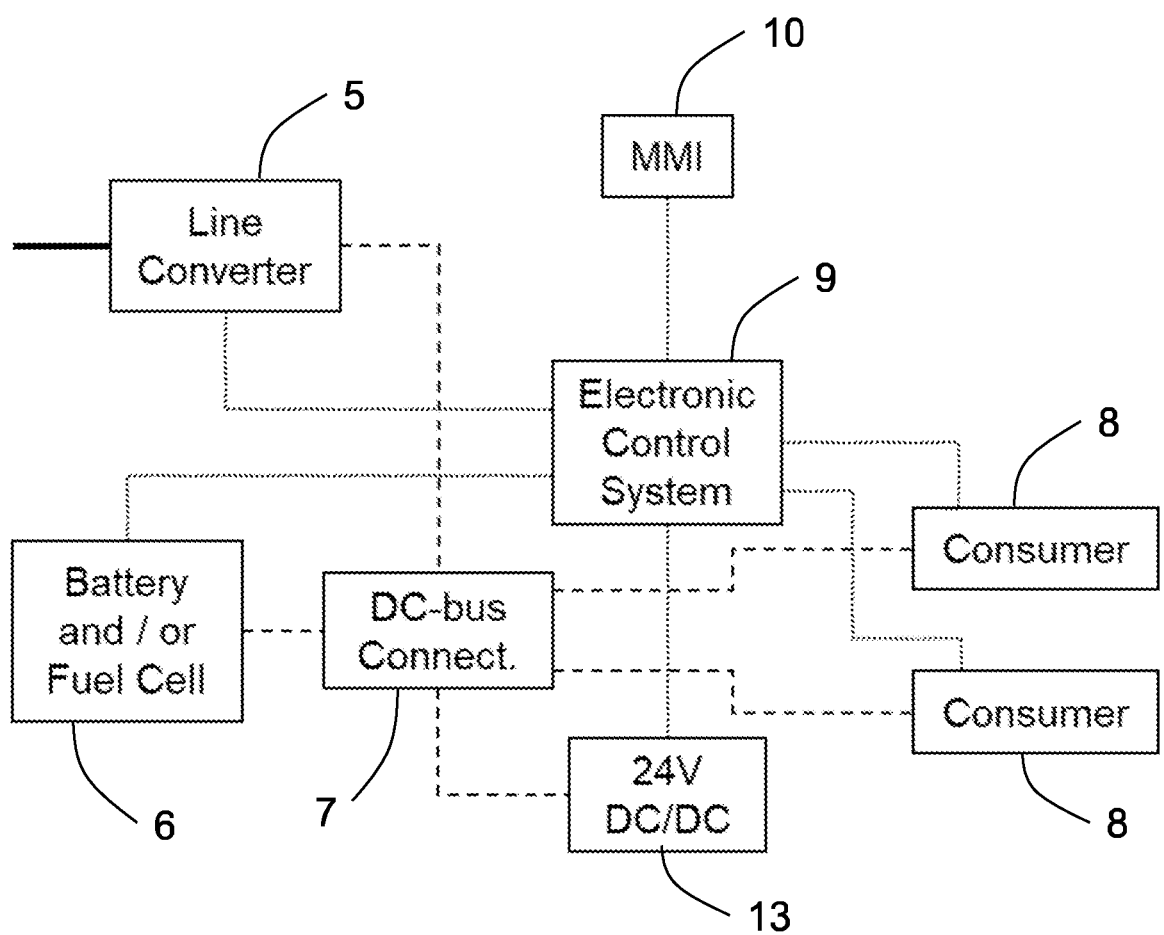
FIG. 2 shows a simplified block diagram of an example electrical system in a surface drill rig as shown in FIG. 1.

With reference to FIG. 2, there is shown a simplified block diagram of an example electrical system 1 in such a machine 2 as described herein. A man-machine-interface (MMI) 10 is provided for enabling a machine operator to interact with an electronic control system (ECS) 9 of the machine. A line converter 5 is selectively connectable to a mains power source 4, e.g. electrical grid, as well as to a battery 6 and/or fuel cell mounted on-board the machine 2. Both the mains power source 4 and the battery 6 and/or fuel cell are connected to a DC bus 7 arranged to supply on-board consumers 8 of electrical energy. These on-board-consumers 8 may be inverters which in turn supplies electric motors. A low voltage system 13, here illustrated as 24V DC/DC, is provided for powering the electronic control system 9. In FIG. 2 Electric AC power lines are drawn as full lines, electric DC power lines are dashed, and control signal lines are shown as dotted. The block diagram of FIG. 2 has been simplified through the omission of some components that may be required depending on the particular implementation, such as transformers, filters, inverters for powering some on-board consumers, battery/fuel cell control and thermal management systems etc., as will be evident to the skilled person.

Figure 3:
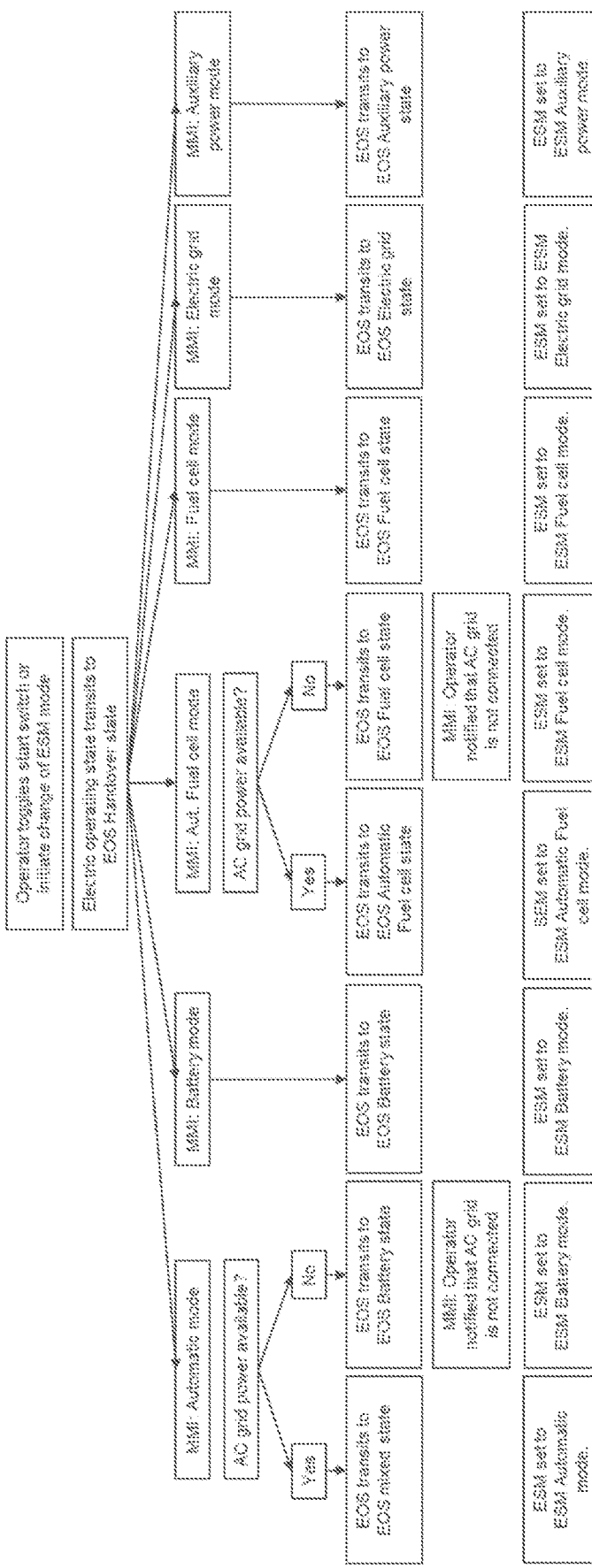
FIG. 3 shows a schematic view of the interaction between energy supply modes and electric operating states.

As illustrated in FIG. 3, the method comprises providing a number of predefined energy supply modes (ESM) in the electronic control system 9 defining how energy from any connected mains power source 4 and the battery 6 and/or fuel cell is to be distributed to the on-board consumers 8, each respective energy supply mode is arranged to be individually operator selectable using the man machine interface 10.

In accordance with the method a number of predefined control sequences is provided in the electronic control system 9. These predefined control sequences define start-up sequences for initiating each respective energy supply mode, shutdown sequences for terminating each respective energy supply mode, and handover sequences for changing from a first selected energy supply mode to a second subsequently selected energy supply mode.

The method further comprises controlling, by the control system 9, in response to operator selection information from the man machine interface 10 of selection of activation of a specific energy supply mode, the predefined control sequence for start-up of, or if already operating in another energy supply mode handover to, the operator selected specific energy supply mode. Alternatively, in response to operator selection information from the man machine interface 10 of selection of de-activation of a specific energy supply mode, the predefined shutdown sequences for terminating the operator selected specific energy supply mode.

The method further comprises making selectable via the man machine interface 10 at least one of the following energy supply modes: an ESM Automatic mode, when at least one of the mains power source 4 and the battery 6 are connected; an ESM Battery mode, when only the battery 6 is connected; an ESM Automatic Fuel cell mode, when at least one of the mains power source 4 and the fuel cell or the fuel cell and battery are connected; an ESM Fuel cell mode, when either only the fuel cell or the fuel cell and battery is connected; an ESM Electric Grid mode, when only the mains power source 4 is connected; and an ESM Auxiliary power mode, when at least one of the mains power source 4 and the battery 6 and/or fuel cell are connected and all but a pre-determined selection of on-board consumers 8 are inactive.

ESM Automatic mode is used when both the battery 6 and the cable 3 for the electrical network 4 are connected. In ESM Automatic mode, the power taken out of the electrical network 4 and transmitted to the DC bus 7 is controlled by the electronic control system 9, which in turn controls the line converter 5. By controlling the power from the electrical network 4, it is possible to either, only use energy from the electrical network to supply the consumers 8 (motors, DC/DC converters, etc.) with energy (the current SOC level of the battery 6 does not change then) or, alternatively, it is possible to control more power from the grid 4 via the electronic control system 9/line converter 5 than the consumers 8 dispose of, and the battery 6 will then be charged (SOC increases), or it is possible to control, via the electronic control system 9/line converter 5, less power from the grid 4 than what the on-board consumers 8 do away with, the battery 6 will then be discharged and the battery 6 is used as an energy source (SOC decreases). In this ESM Automatic mode, the drilling rig 2 has the opportunity to perform all work steps that it normally performs.

Thus, the method further comprises controlling, in the ESM Automatic mode, supply of electrical energy to all on-board consumers 8 to be from the mains power source 4 whilst either controlling the line converter 5 to balance the power output from the mains power source 4 against the requirement of the on-board consumers 8 maintaining a current SOC level of the battery 6, or alternatively controlling the line converter 5 to increase the power output from the mains power source 4 above the requirement of the on-board consumers 8 increasing the SOC level of the battery 6, or controlling the line converter 5 to decrease the power output from the mains power source 4 below the requirement of the on-board consumers 8 decreasing the SOC level of the battery 6.

In ESM Battery mode, the cable 3 to the electrical network 4 is not connected, but the machine's 2 energy supply is completely from the battery 6. In this ESM Battery mode, the drilling rig 2 has the opportunity to perform all the work steps that it normally performs as long as there is energy left in the battery 6.

Thus, the method further comprises controlling, in the ESM Battery mode, supply of electrical energy to all on-board consumers 8 to be from the battery only 6.

In ESM Electric Grid mode, the battery 6 is not connected to the machine's electrical system, but the machine's 2 energy supply takes place entirely from the electrical network 4. In this ESM Electric Grid mode, the drilling rig 2 has the ability to perform all operations that it normally performs, as long as it remains connected to the electrical network 4.

Thus, the method further comprising controlling, in the ESM Electric Grid mode, supply of electrical energy to all on-board consumers 8 to be from the mains power source 4 only.

ESM Auxiliary power mode is used to supply the machine 2 with energy when not in use. In ESM Auxiliary power mode, the machine 2 can either only be connected to the mains 4, only have the battery 6 and/or fuel cell connected or have both battery 6 and/or fuel cell and mains 4 connected. ESM Auxiliary power mode can e.g., be used to supply the machine 2 with energy from the mains 4 so that the battery 6 is charged when the machine 2 is not in use, or, to supply the machine 2 with energy from the battery 6 and/or fuel cell or mains 4 such that components and an operator cab can be heated when the machine 2 is not in use. In ESM Auxiliary power mode, the functions for performing the normal operation of the machine 2 are locked, e.g. via a key, so that the machine 2 does not move involuntarily.

Thus, the method further comprises controlling, in the ESM Auxiliary power mode, supply of electrical energy to the pre-determined selection of on-board consumers 8 to be from either only the mains power source 4, only the battery 6 and/or fuel cell or both the mains power source 4 and the battery 6 and/or fuel cell.

In embodiments where a full cell is provided the method further comprises controlling, in the ESM Automatic Fuel cell mode, supply of electrical energy to all on-board consumers 8 to be from the mains power source 4 or controlling the line converter 5 to balance the power output from the mains power source 4 and the power output from the fuel cell or the fuel cell and battery against the requirement of the on-board consumers 8.

The method further comprises controlling, in the ESM Fuel cell mode, supply of electrical energy to all on-board consumers 8 to either be only from the fuel cell or from the fuel cell and battery.

In accordance with the proposed method, during the predefined control sequence for start-up of the ESM Automatic mode is checked if the mains power source 4 is connected. If it is determined that the mains power source 4 is not connected a predefined control sequence for changing from the ESM Automatic mode to the ESM Battery mode is initiated and information is provided to the man machine interface (MMI) 10 that the machine 2 is operating in the ESM Battery mode.

Envisaged herein is also an electronic control system 9 at an electrically powered mining or construction machine 2 that includes and a man machine interface (MMI) 10 and a line converter 5 that is selectively connectable to a mains power source 4 and a battery 6 and/or fuel cell mounted on-board the machine 2 where both the mains power source 4 and the battery 6 and/or fuel cell are connected to a DC bus 7 arranged to supply on-board consumers 8 of electrical energy, the control system 9 being arranged to perform the method in the electronic control system 9 as described herein.

Envisaged herein is also a non-transitory computer-readable storage medium that stores a program configured to execute the method in an electronic control system 9 as described herein.

The non-transitory computer-readable storage medium, that stores a program configured to execute the method of electrical power distribution in an electronic control system 9 at an electrically powered mining or construction machine 2, is suitably a non-volatile memory, i.e. a memory that retains stored data after power is turned off, such as an electrically erasable programmable read-only memory (EEPROM), a flash Read-only Memory (ROM), a hard disk drive (HDD), solid state drive (SSD), an optical storage media or similar.

Further envisaged herein is also a computer program product comprising instructions which, when the program is executed by a computer, cause the computer to carry out the method in an electronic control system 9 as described herein.

To be able to use and switch between the different power supply modes, a number of electrical contactors and other electrical components (not shown) must be placed in the correct position. The position of the electrical components, or "state", is associated with which power supply mode the machine 2 is in or is about to be switched to. Change of energy supply mode requires a number of activities to be performed, e.g. so-called pre-charge of the DC bus 7. Through well-defined energy supply modes, sequences and activities at start-up and energy supply mode change are simplified, systematized, and automated.

To further systematize start-up and energy supply mode change, the position of the electric components, state, can be defined in "electric operating states", EOS. FIG. 3 illustrates schematically one example setup of interaction between energy supply modes and electric operating states.

The sequence to arrive at an energy supply mode and the electric operating states the system uses are implemented as algorithms, e.g. via program code, and executed in "electronic control system" 9 of FIG. 2. Electrical components are selected, and electrical system layout is designed to enable the various Electric Operating States needed.

In the following will, as illustrated in FIG. 3, be given examples of start-up sequences, shutdown sequences and mode changes for the respective Energy Supply Modes.

Each example sequence may comprise one or more operator actions, such as: Connecting/disconnecting a mains power cable 3; activating/de-activating a low voltage system 13 to e.g. power up/shut-down the electronic control system 9; starting and shutting down the machine 2, e.g. turning on or off the ignition; starting and shutting-off electrical consumers 8, such as electric motors. Requesting a change of operating mode using the MMI 10 and further operator actions as required for a defined sequence.

For each respective sequence the electronic control system 9 controls a number of activities, as required for the desired sequence, such as controlling the different subsystems of the machine 2, e.g. battery management system, thermal management systems, pre-charge/discharge of the DC bus 7, controlling motor-inverters of on-board motor consumers 8, opening and closing contactors and relays as required, handling of possible faults etc.

Sequence for starting the system in ESM Automatic mode-option 1: mains cable 3 connected. An operator toggles a start switch or initiates change of ESM mode. The electric operating state transits to EOS Handover state. The operator makes a choice of the ESM Automatic mode through the MMI 10. A determination that the AC power grid 4 is available is made. The electric operating state transits to EOS mixed state and the energy supply mode is set to ESM Automatic mode, in which mainly electric energy from the grid 4 is used but with a possibility to use energy from the battery 6 or to charge the battery 6. There should also, although not illustrated in FIG. 3, be specified a sequence for shutting down the system in ESM Automatic mode-option 1: mains cable 3 connected.

Sequence for starting the system in ESM Automatic mode-option 2: mains cable 3 not connected. An operator toggles a start switch or initiates change of ESM mode. The electric operating state transits to EOS Handover state. The operator makes a choice of the ESM Automatic mode through the MMI 10. A determination that the AC power grid 4 is unavailable is made. The operator is notified that the AC grid 4 is not connected via the MMI 10. The electric operating state transits to EOS Battery state and the energy supply mode is set to ESM Battery mode, in which only electric energy from the battery 6 is used. There should also, although not illustrated in FIG. 3, be specified a sequence for shutting down the system in ESM Automatic mode-option 2: mains cable 3 not connected.

Sequence to start the system in ESM Battery mode. An operator toggles a start switch or initiates change of ESM mode. The electric operating state transits to EOS Handover state. The operator makes a choice of the ESM Battery mode through the MMI 10. Electric operating state transits to EOS Battery state and the energy supply mode is set to ESM Battery mode, in which only electric energy from the battery 6 is used. There should also, although not illustrated in FIG. 3 be specified a sequence to shut down the system in ESM Battery mode.

Sequence for starting the system in ESM Automatic Fuel cell mode-option 1: mains cable 3 connected. An operator toggles a start switch or initiates change of ESM mode. The electric operating state transits to EOS Handover state. The operator makes a choice of the ESM Automatic Fuel cell mode through the MMI 10. A determination that the AC power grid 4 is available is made. The electric operating state transits to EOS Automatic Fuel cell state and the energy supply mode is set to ESM Automatic Fuel cell mode, in which mainly electric energy from the grid 4 is used but with the possibility to use energy from the fuel cell or the fuel cell and battery. There should also, although not illustrated in FIG. 3 be specified a sequence to shut down the system in ESM Automatic Fuel cell mode.

Sequence for starting the system in ESM Automatic Fuel cell mode-option 2: mains cable 3 not connected. An operator toggles a start switch or initiates change of ESM mode. The electric operating state transits to EOS Handover state. The operator makes a choice of the ESM Automatic Fuel cell mode through the MMI 10. A determination that the AC power grid 4 is unavailable is made. The operator is notified that the AC grid 4 is not connected via the MMI 10. The electric operating state transits to EOS Fuel cell state and the energy supply mode is set to ESM Fuel cell mode, in which either only electric energy from the fuel cell is used or electric energy from the fuel cell and battery. There should also, although not illustrated in FIG. 3 be specified a sequence to shut down the system in ESM Fuel cell mode.

Sequence to start the system in ESM Fuel cell mode. An operator toggles a start switch or initiates change of ESM mode. The electric operating state transits to EOS Handover state. The operator makes a choice of the ESM Fuel cell mode through the MMI 10. Electric operating state transits to EOS Fuel cell state and the energy supply mode is set to ESM Fuel cell mode, in which either only electric energy from the fuel cell is used or electric energy from the fuel cell and battery. There should also, although not illustrated in FIG. 3 be specified a sequence to shut down the system in ESM Fuel cell mode.

Sequence to start the system in ESM Electric grid mode. An operator toggles a start switch or initiates change of ESM mode. The electric operating state transits to EOS Handover state. The operator makes a choice of the ESM Electric grid mode through the MMI 10. Electric operating state transits to EOS Electric grid state and the energy supply mode is set to ESM Electric grid mode, in which only electric energy from the grid 4 is used, the battery 6 is disconnected. There should also, although not illustrated in FIG. 3 be specified a sequence to shut down the system in ESM Electric grid mode.

Sequence to start the system in ESM Auxiliary power mode. An operator toggles a start switch or initiates change of ESM mode. The electric operating state transits to EOS Handover state. The operator makes a choice of the ESM Auxiliary power mode through the MMI 10. Electric operating state transits to EOS Auxiliary power state and the energy supply mode is set to ESM Auxiliary power mode, in which electric energy is available for e.g. heating an operator cabin or to charge the battery 6. There should also, although not illustrated in FIG. 3 be specified a sequence to shut down the system in ESM Auxiliary power mode.

There should also, although not illustrated in FIG. 3, be defined sequences for mode changes, such as: a sequence for changing mode from ESM Automatic mode to ESM Battery mode-option 1: mains cable 3 connected; a sequence for changing mode from ESM Automatic mode to ESM Battery mode-option 2: mains cable 3 not connected; a sequence for changing mode from ESM Battery mode to ESM Automatic mode; a sequence for changing mode from ESM Automatic mode to ESM Electric grid mode-option 1: mains cable 3 connected when the sequence starts; a sequence for changing mode from ESM Automatic mode to ESM Electric grid mode-option 2: mains cable 3 not connected when the sequence starts; a sequence for changing mode from ESM Electric grid mode to ESM Automatic mode; sequence for changing mode from ESM Battery mode to ESM Electric grid mode; and a sequence for changing mode from ESM Electric grid mode to ESM Battery mode.

In cases where a fuel cell is mounted on the machine 2 and ESM Automatic Fuel cell mode or ESM Fuel cell mode is selected, in example embodiments the start-up sequence for ESM Automatic mode or ESM Battery mode can be followed and the fuel cell is connected to the DC bus 7 after the battery 6 and possibly line converter 5 has been connected.

If an operator wants to use ESM Auxiliary power mode, for example to charge the battery 6 or heat the cab, this is stated in the MMI 10 while the machine 2 is running. Depending on which ESM mode the machine 2 is in, different functions will be available when the machine 2 is switched off. For example, to charge the battery 6 after the end of a work shift, the machine 2 must be in ESM Automatic mode and both mains 4 and battery 6 cables need to be connected. In the event that the operator wishes to charge the machine 2 after the end of a session, the operator sets the function to be used via the machine's MMI 10 and then switches off the ignition and locks the machine 2. The machine's 2 electronic control system keeps the energy supply system up until the correct SOC level is reached. When the correct SOC level is reached, an algorithm executes a shutdown sequence for ESM Automatic mode and the machine 2 shuts down.

If an operator wishes to heat the machine 2, its battery 6 or cab before the start of a work shift, the operator sets the function to be used via the machine's MMI 10 and then switches off the ignition and locks the machine 2. The machine 2 then follows the shutdown sequence for the current ESM mode. A timer in the machine's control system or an optional SMS function, application for a portable communication device or similar, can be employed to activate the function, and the machine 2 is started up according to the start-up sequence for the most recently used ESM mode, which means that it is possible to supply a suitable consumer 8, e.g. an electric heating element, with energy from an on-board battery 6 and/or fuel cell or mains 4.

Although the invention has been illustrated and described in detail in the drawings and foregoing description, such illustration and description are to be considered illustrative or exemplary and the invention is not limited to the disclosed embodiments. For example, the non-transitory computer-readable storage medium may, where an electronic control system 9 is connected, i.e. has a wired or wireless connection to a computer network, such as the internet, alternatively be located remote from the electronic control system 9, e.g. in a remote server or so-called cloud-service, and accessed via a wired or wireless connection.

The invention claimed is:

1. A method of electrical power distribution by an electronic control system at an electrically powered mining or construction machine that includes a man machine interface and a line converter that is selectively connectable to a mains power source and a battery and/or fuel cell mounted on-board the machine where both the mains power source and the battery and/or fuel cell are connected to a DC bus arranged to supply on-board consumers of electrical energy, the method comprising:

providing a number of predefined energy supply modes in the electronic control system defining how energy from any connected mains power source and the battery and/or fuel cell is to be distributed to the on-board consumers, each respective energy supply mode individually operator selectable using the man machine interface, providing a number of predefined control sequences in the electronic control system defining start-up sequences for initiating each respective energy supply mode, shutdown sequences for terminating each respective energy supply mode, and handover sequences for changing from a first selected energy supply mode to a second subsequently selected energy supply mode;

wherein the method further comprises:

controlling, by the control system, in response to operator selection information from the man machine interface of selection of activation of a specific energy supply mode, the predefined control sequence for start-up of, or if already operating in another energy supply mode handover to, the operator selected specific energy supply mode, or in response to operator selection information from the man machine interface of selection of de-activation of a specific energy supply mode, the predefined shutdown sequences for terminating the operator selected specific energy supply mode.

2. The method according to claim 1, further comprising making selectable via the man machine interface at least one of:

an ESM Automatic mode, when at least one of the mains power source and the battery are connected;

an ESM Battery mode, when only the battery is connected;

an ESM Automatic Fuel cell mode, when at least one of the mains power source and the fuel cell or fuel cell and battery are connected;

an ESM Fuel cell mode, when either only the fuel cell or the fuel cell and battery is connected;

an ESM Electric Grid mode, when only the mains power source is connected; and an ESM Auxiliary power mode, when at least one of the mains power source and the battery and/or fuel cell are connected and all but a pre-determined selection of on-board consumers are inactive.

3. The method according to claim 2, further comprising:
controlling, in the ESM Automatic mode, supply of electrical energy to all on-board consumers to be from the mains power source whilst either controlling the line converter to balance the power output from the mains power source against the requirement of the on-board consumers maintaining a current SOC level of the battery, or alternatively controlling the line converter to increase the power output from the mains power source above the requirement of the on-board consumers increasing the SOC level of the battery, or controlling the line converter to decrease the power output from the mains power source below the requirement of the on-board consumers decreasing the SOC level of the battery.

4. The method according to claim 2, further comprising:
controlling, in the ESM Battery mode, supply of electrical energy to all on-board consumers to be from the battery only.

5. The method according to claim 2, further comprising:
controlling, in the ESM Automatic Fuel cell mode, supply of electrical energy to all on-board consumers to be from the mains power source or controlling the line converter to balance the power output from the mains power source and the power output from the fuel cell or the fuel cell and battery against the requirement of the on-board consumers.

6. The method according to claim 2, further comprising:
controlling, in the ESM Fuel cell mode, supply of electrical energy to all on-board consumers to either be only from the fuel cell or from the fuel cell and battery.

7. The method according to claim 2, further comprising:
controlling, in the ESM Electric Grid mode, supply of electrical energy to all on-board consumers to be from the mains power source only.

8. The method according to claim 2, further comprising:
controlling, in the ESM Auxiliary power mode, supply of electrical energy to the pre-determined selection of on-board consumers to be from either only the mains power source, only the battery and/or fuel cell or both the mains power source and the battery and/or fuel cell.

9. The method according to claim 2, further comprising:
checking during the predefined control sequence for start-up of the ESM Automatic mode if the mains power source is connected and if determined not connected initiating a predefined control sequence for changing from the ESM Automatic to the ESM Battery mode and providing to the man machine interface information that the machine is operating in the ESM Battery mode.

10. An electronic control system at an electrically powered mining or construction machine that includes a man machine interface and a line converter that is selectively connectable to a mains power source and a battery and/or fuel cell mounted on-board the machine where both the mains power source and the battery and/or fuel cell are connected to a DC bus arranged to supply on-board consumers of electrical energy, the control system being arranged to perform the method of claim 1.

11. A non-transitory computer-readable storage medium that stores a program configured to execute the method comprising providing a number of predefined energy supply modes in the electronic control system defining how energy from any connected mains power source and the battery and/or fuel cell is to be distributed to the on-board consumers, each respective energy supply mode individually operator selectable using the man machine interface, providing a number of predefined control sequences in the electronic control system defining start-up sequences for initiating each respective energy supply mode, shutdown sequences for terminating each respective energy supply mode, and handover sequences for changing from a first selected energy supply mode to a second subsequently selected energy supply mode;

wherein the method further comprises:

controlling, by the control system, in response to operator selection information from the man machine interface of selection of activation of a specific energy supply mode, the predefined control sequence for start-up of, or if already operating in another energy supply mode handover to, the operator selected specific energy supply mode, or in response to operator selection information from the man machine interface of selection of de-activation of a specific energy supply mode, the predefined shutdown sequences for terminating the operator selected specific energy supply mode in a system according to claim 10.

\* \* \* \* \*